(12) United States Patent  
Liu et al.

(10) Patent No.: US 8,121,824 B2
(45) Date of Patent: *Feb. 21, 2012

(54) PREDICATE CHECKING FOR DISTRIBUTED SYSTEMS

(75) Inventors: Xuezheng Liu, Beijing (CN); Wei Lin, Beijing (CN); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/077,345

(22) Filed: Mar. 31, 2011

(65) Prior Publication Data

US 2011/0178788 A1     Jul. 21, 2011

Related U.S. Application Data

(63) Continuation of application No. 12/058,362, filed on Mar. 28, 2008, now Pat. No. 7,933,759.

(51) Int. Cl.
*G06F 17/50* (2006.01)
*G06F 15/173* (2006.01)

(52) U.S. Cl. .......... 703/13; 709/201; 709/222; 709/224; 714/E11.21

(58) Field of Classification Search .............. 703/13; 709/201, 221, 222, 224; 714/E11.21, E11.218
See application file for complete search history.

(56) References Cited

U.S. PATENT DOCUMENTS

| | | | |
|---|---|---|---|
| 5,371,746 A | 12/1994 | Yamashita et al. | |
| 5,768,591 A | 6/1998 | Robinson | |
| 5,933,639 A | 8/1999 | Meier et al. | |
| 5,999,734 A | 12/1999 | Willis et al. | |
| 6,042,614 A | 3/2000 | Davidson et al. | |
| 6,058,393 A | 5/2000 | Meier et al. | |
| 6,083,281 A | 7/2000 | Diec et al. | |
| RE36,852 E | 9/2000 | Heinen, Jr. | |
| 6,324,683 B1 | 11/2001 | Fuh et al. | |
| 6,470,388 B1 | 10/2002 | Niemi et al. | |
| 6,961,926 B2 | 11/2005 | Koyama | |
| 7,039,014 B1 | 5/2006 | Krishnamurthy et al. | |
| 7,096,264 B2 | 8/2006 | Bonney et al. | |
| 7,096,459 B2 | 8/2006 | Keller et al. | |
| 7,133,820 B2 | 11/2006 | Pennello et al. | |
| 7,162,467 B2 * | 1/2007 | Eshleman et al. | 1/1 |

(Continued)

OTHER PUBLICATIONS

Garg, et al., "Detection of Strong Unstable Predicates in Distributed Programs", available at least as early as Apr. 19, 2007, at <<http://www.ece.utexas.edu/~garg/dist/tpds96.ps>>, pp. 1-20.

(Continued)

*Primary Examiner* — Russell Frejd
(74) *Attorney, Agent, or Firm* — Lee & Hayes, PLLC

(57) ABSTRACT

Predicate checking in conjunction with distributed systems can enable an investigating user to check predicates in the context of instance states and/or distributed states of a distributed system. In an example embodiment, a method entails accepting distributed system simulation data and performing a simulation of a distributed system using the distributed system simulation data to create distributed system simulated states. At least a portion of the distributed system simulated states are exposed. The exposed portion of the distributed system simulated states is retrieved and stored as exposed states for the distributed system. The exposed states for the distributed system are compared to predicate states for the distributed system. If an inconsistency is detected between the exposed states and the predicate states based on the comparing, at least one alarm is issued.

20 Claims, 8 Drawing Sheets

U.S. PATENT DOCUMENTS

| | | |
|---|---|---|
| 7,185,319 B2 | 2/2007 | Kaler et al. |
| 2002/0174415 A1 | 11/2002 | Hines |
| 2003/0135400 A1 | 7/2003 | Mellander |
| 2006/0004862 A1 | 1/2006 | Fisher et al. |
| 2007/0014248 A1 | 1/2007 | Fowlow |

OTHER PUBLICATIONS

Geels, et al., "Friday: Global Comprehension for Distributed Replay", available at least as early as Apr. 20, 2007, at <<http://berkeley.intel-research.net/maniatis/publications/NSDI2007Friday.pdf>>, NSDI, 2007, pp. 1-14.

Joyce, et al., "Monitoring Distributed Systems", available at least as early as Apr. 20, 2007, at <<http://pharos.cpsc.ucalgary.ca/Dienst/Repository/2.0/Body/ncstrl.ucalgary_cs/1985-213-26/pdf >>, ACM, vol. 5, No. 2, May 1987, pp. 121-150.

Killian, et al., "Life, Death, and the Critical Transition: Finding Liveness Bugs in Systems Code," USENIX Association, NSDI '07, 4th USENIX Symposium on Networked Systems Design & Implementation, pp. 243-256.

Mittal, et al., "Debugging Distributed Programs Using Controlled Re-execution", available at least as early as Apr. 19, 2007, at <<http://delivery.acm.org/10.1145/350000/343624/p239-mittal.pdf?key1=343624&key2=7792696711&coll=GUIDE&dl=GUIDE&CFID=16819920&CFTOKEN=59133013>>, ACM, 2000, pp. 239-248.

Rabenseifner, "The Controlled Logical Clock—a Global Time for Trace Based Software Monitoring of Parallel Applications in Workstation Clusters", available at least as early as Apr. 20, 2007, at <<http://elib.uni-stuttgart.de/opus/volltexte/1999/59/pdf/59.pdf>>, IEEE, 1996, pp. 1-8.

Sen, et al., "Formal Verification of Simulation Traces Using Computation Slicing", IEEE Transactions on Computers, vol. 56, No. 4, Apr. 2007, pp. 511-527.

Singh, et al., "Using Queries for Distributed Monitoring and Forensics," Appears in EuroSys, Leuven, Belgium, Apr. 2006, pp. 1-14.

Tarafdar, et al., "Predicate Control for Active Debugging of Distributed Programs", available at least as early as Apr. 19, 2007, at <<http://www.ece.utexas.edu/~garg/dist/spdp98.ps>>, pp. 1-7.

* cited by examiner

Message Flow Graph Example

PREDICATE CHECKING FOR DISTRIBUTED SYSTEMS

RELATED AND PRIORITY APPLICATIONS

This Application is a continuation of and claims priority to U.S. patent application Ser. No. 12/058,362 now U.S. Pat. No. 7,933,759, filed on Mar. 28, 2008, entitled "Predicate Checking for Distributed Systems," naming Xuezheng Liu, Wei Lin, and Zheng Zhang as inventors. U.S. Pat. No. 7,933,759, is incorporated by reference herein in its entirety.

BACKGROUND

From large clusters serving as back-ends to large-scale peer-to-peer (P2P) networks, distributed systems are important to many of today's Internet services. Distributed systems can involve many nodes. In fact, these nodes can number in the tens, hundreds, thousands, millions or more nodal instances. Each instance may be, for example, a process, an application, a physical device, some combination thereof, and so forth. Each of the individual nodes of a distributed system can operate interactively with one other, with two other, or with many other nodes of the distributed system. Such interactions may occur once or may be repeated one or more times.

The multiple nodes of a distributed system usually communicate messages between and among each other. Each node also functions locally by acting on local resources. These various actions and interactions result in many different non-deterministic concurrences happening within the distributed system. The protocols of distributed systems typically involve complex interactions among a collection of networked machines, and they are faced with failures ranging from overall network problems to individual crashing nodes. Intricate sequences of events can trigger complex errors as a result of mishandled corner cases.

As a result of these concurrent events and the sheer number of nodal instances, it is especially challenging to design, implement, and test distributed systems. For example, bugs in distributed systems are usually difficult to analyze. It is even more difficult to diagnose and/or identify the cause or causes of bugs in distributed systems. In fact, the most challenging bugs are typically not the ones that crash the distributed system immediately, but they are instead the ones that corrupt certain design properties and thus drive the system to unexpected behaviors after long execution runs.

SUMMARY

Predicate checking in conjunction with distributed systems can enable an investigating user to check predicates in the context of instance states and/or distributed states of a distributed system. In an example embodiment, a method entails accepting distributed system simulation data and performing a simulation of a distributed system using the distributed system simulation data to create distributed system simulated states. At least a portion of the distributed system simulated states are exposed. The exposed portion of the distributed system simulated states is retrieved and stored as exposed states for the distributed system. The exposed states for the distributed system are compared to predicate states for the distributed system. If an inconsistency is detected between the exposed states and the predicate states based on the comparison, at least one alarm is issued.

In another example embodiment, at least one device includes a distributed system simulator and a distributed system predicate checker. The distributed system simulator is to perform a simulation of a distributed system. It is to accept distributed system simulation data as input and to output distributed system simulation states. The distributed system simulator is capable of exposing the distributed system simulation states. The distributed system predicate checker is to check predicates in conjunction with the distributed system. The distributed system predicate checker includes exposed states for the distributed system, a checker control unit, predicate states for the distributed system, and a checker comparator. The checker control unit is to retrieve exposed states from the distributed system simulation states of the distributed system simulator and to insert the retrieved exposed states into the exposed states for the distributed system. The checker comparator is to compare the exposed states for the distributed system to the predicate states for the distributed system and to issue at least one alarm if an inconsistency is detected between the exposed states and the predicate states.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Moreover, other method, system, scheme, apparatus, device, media, procedure, API, arrangement, etc. embodiments are described herein.

BRIEF DESCRIPTION OF THE DRAWINGS

The same numbers are used throughout the drawings to reference like and/or corresponding aspects, features, and components.

DETAILED DESCRIPTION

Figure 1:
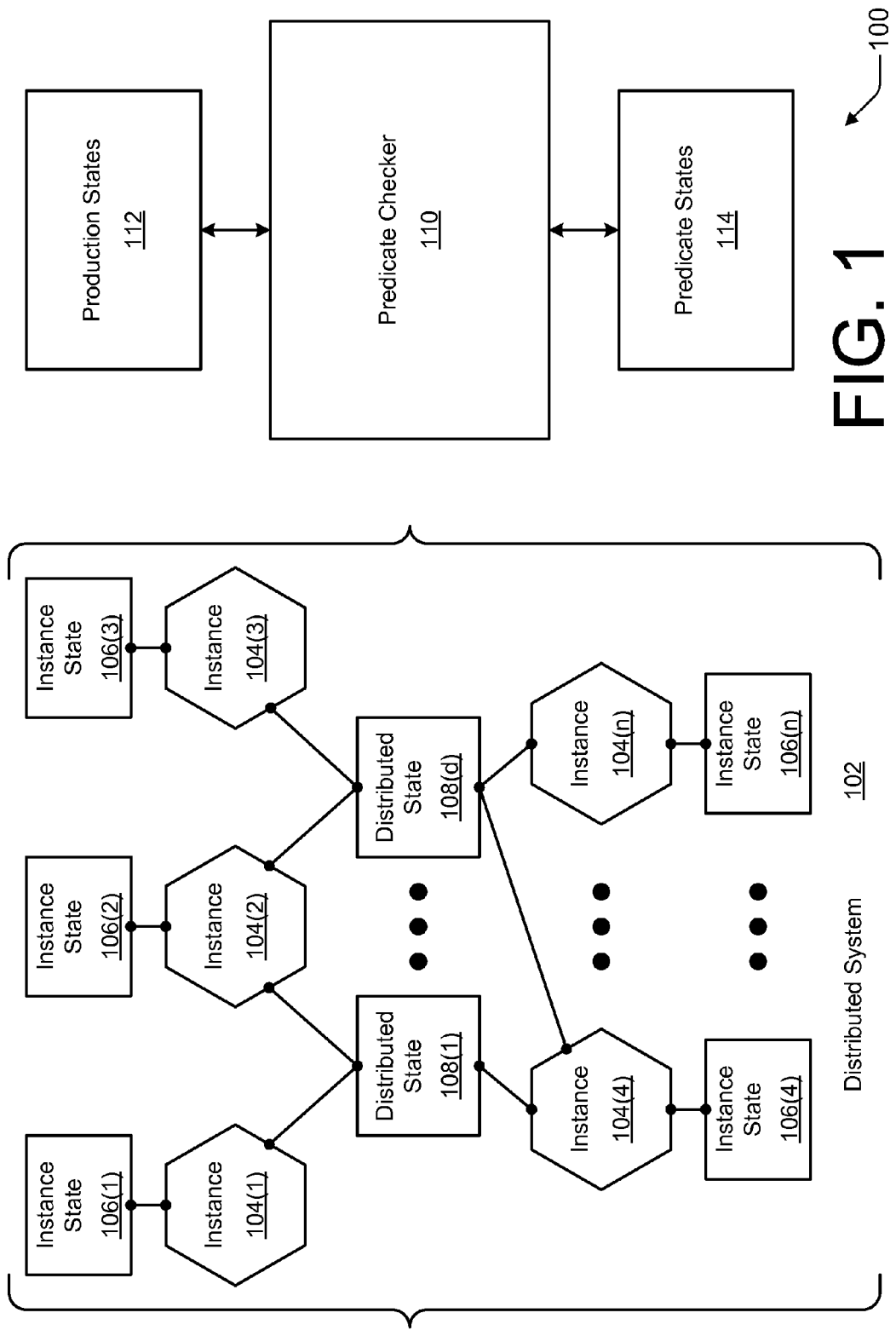
FIG. 1 is a block diagram that illustrates an example of a distributed system and a predicate checker that has access to production and predicate states.

Introduction to Predicate Checking for Distributed Systems

In spite of the increased prevalence of distributed systems, the predominant practice for debugging them has remained unchanged over the years. This practice involves manually inspecting logs dumped at different machines participating in the distributed system. Typically, developers embed "printf" statements at various implementation points, perform tests, somehow stitch the logs together, and then look for inconsistencies. However, this log mining is labor-intensive, and its likelihood of success is fragile.

More specifically, log mining has the following drawbacks. First, log events are enormous in number, making their manual inspection tedious and error-prone. Second, latent bugs often affect application properties that are themselves distributed across multiple nodes, and verifying them from local events alone can be very difficult. More importantly, logs reflect only incomplete information of an execution, and the incomplete information is sometimes insufficient to reveal the bugs.

For instance, application behavior can be logged in terms of communication structures, timing, and resource usages. These logged items may then be compared against developer expectations. Unfortunately, applications having correct message sequences can perform unintended things and mutate inner states because of buggy internal logic. Consequently, it can be difficult if not impossible to catch the existence of these subtle bugs using only logs, unless many more other states in addition to those relating to communication are also logged. This of course multiplies the size of the logs and dramatically increases the difficulty of manually sifting through them.

It is a common experience that omitting a key logging point can miss a bug and thus render an entire debugging exercise a complete failure. However, adding such a key logging point back can substantially change subsequent runs and even hide the bug. The non-determinism of distributed applications plus the limitations of log-based debugging of the "printf" variety makes such "Heisenbugs" a nightmare for developers. Building a time machine so that bugs can be deterministically replayed gets rid of the artifacts of using logs. Nevertheless, there is still no comprehensive framework to express the correctness properties, catch the violation points, and identify their root causes.

Hence, a productive debugging tool for distributed applications may offer one or more of the following capabilities: 1) efficient verification of application properties, including the distributed ones; 2) availability of fairly complete information about an execution, such that developers can observe arbitrary application states for any unforeseen running cases; and/or 3) reproduction of the buggy runs deterministically and faithfully, to thereby enable a cyclic debugging process. Certain embodiments as described herein are directed toward at least partially providing one or more of these capabilities.

In an example embodiment, debugging is enabled with a unified framework termed a Middleware Distributed System (MiDS) Checker. This MiDS platform logs the actual execution of a distributed system. Predicate checking is then applied in a centralized simulator over a run that is either driven by testing scripts or is deterministically replayed by the logs. The checker outputs violation reports along with message traces, which enables "time-traveling" to identify the root cause(s) of bugs.

EXAMPLE EMBODIMENTS FOR PREDICATE CHECKING FOR DISTRIBUTED SYSTEMS

1: Introduction—Overview and Example Environments

FIG. 1 is a block diagram 100 that illustrates an example of a distributed system 102 and a predicate checker 110 that has access to production states 112 and predicate states 114. As illustrated, distributed system 102 includes multiple instances 104. Specifically, "n" instances 104(1), 104(2), 104(3), 104(4) . . . 104(n), with "n" representing some integer, are part of distributed system 102. Each respective instance 104(1 . . . n) is associated with a respective instance state 106(1 . . . n). Distributed system 102 also includes "d" distributed states 108(1) . . . 108(d), with "d" representing some integer.

In an example embodiment, each instance 104 may be a process, an application, a part of an application, a physical device, a part of a physical device, a protocol implementation, a module formed from processor-executable instructions, some combination thereof, and so forth. Each instance 104 may comprise a node of distributed system 102. Nodes, and thus instances 104, may be co-located within a single application and/or physical device, located in different applications and/or physical devices, located in the same or different networks, and so forth. By way of example only, each instance 104 may be a peer entity of a peer-to-peer (P2P) network, a machine in a cluster of machines, and so forth.

Each instance state 106 represents the state of the respectively associated instance 104. An instance state 106 may be a memory configuration, typed objects, permanent or current operational data values, some combination thereof, etc. for an executing instance 104. Each distributed state 108 is derived from two or more instance states 106. Each distributed state 108 is therefore associated with two or more and up to all of instances 104.

Predicate checker 110 is adapted to check predicates with respect to distributed system 102. Predicate states 114 are states that are specified by a designer, programmer, debugger or other investigating user that indicate what states are expected to be in response to given design principles, operational inputs, system constraints, and so forth. Production states 112 are the actual values of instance states 106 and/or distributed states 108 during a real-world operation of distributed system 102.

Ideally, a predicate checker compares production states 112 to predicate states 114. Unfortunately, especially due to the distributed nature of production states 112, such a comparison is difficult if not impossible to achieve, particularly without perturbing the actual operation of distributed system 102. Accordingly, in an example embodiment, distributed system 102 may be simulated to produce simulated states that are similar or even fully equivalent to production states 112. Example approaches to simulation are described below with particular reference to FIGS. 2 and 3.

It is generally impossible to root out all bugs of a distributed system using a simulator alone. The deployed environment can embody different system assumptions, and the full state is unfolded unpredictably. Tracking bugs becomes extremely challenging, especially for the ones causing violation of system properties that are themselves distributed. When debugging non-distributed software and standalone components, developers can check memory states against the correctness properties at runtime based on system design using invariant predicates (e.g., assert( ) in C++). This dynamic predicate checking technique is beneficial for debugging software that executes on a single machine. Unfortunately, this benefit does not extend to distributed systems for two reasons. First, distributed properties reside on multiple machines and cannot be directly evaluated at one place without significant runtime perturbations. Second, even if a violation is detected, the cyclic debugging process is broken because non-determinism across runs makes it nearly impossible to repeat the same code path that initially led to the bug.

To address these deficiencies and to provide a predicate checking capability for distributed systems, a replay-based predicate checking approach is described herein for an example embodiment. This replay-based predicate checking approach enables the execution of the entire distributed system to be replayed afterwards within one or more machines. At the same time, it checks the replayed execution to verify the replay states for nodes based on user-defined predicate states.

This replay-based predicate checking approach is particularly pertinent for certain kinds of bugs. For example, some bugs have a deep path and therefore appear only at fairly large scale. They can not be identified when the system is downscaled. Consequently, they demand a more efficient handling of the state explosion problem when predicate checker is applied to check an actual execution. Many bug cases have correct communication structure and messages. As a result, previous works that verify event sequences can fail to detect such bugs, and they are arguably more effective for performance bugs.

Figure 2:
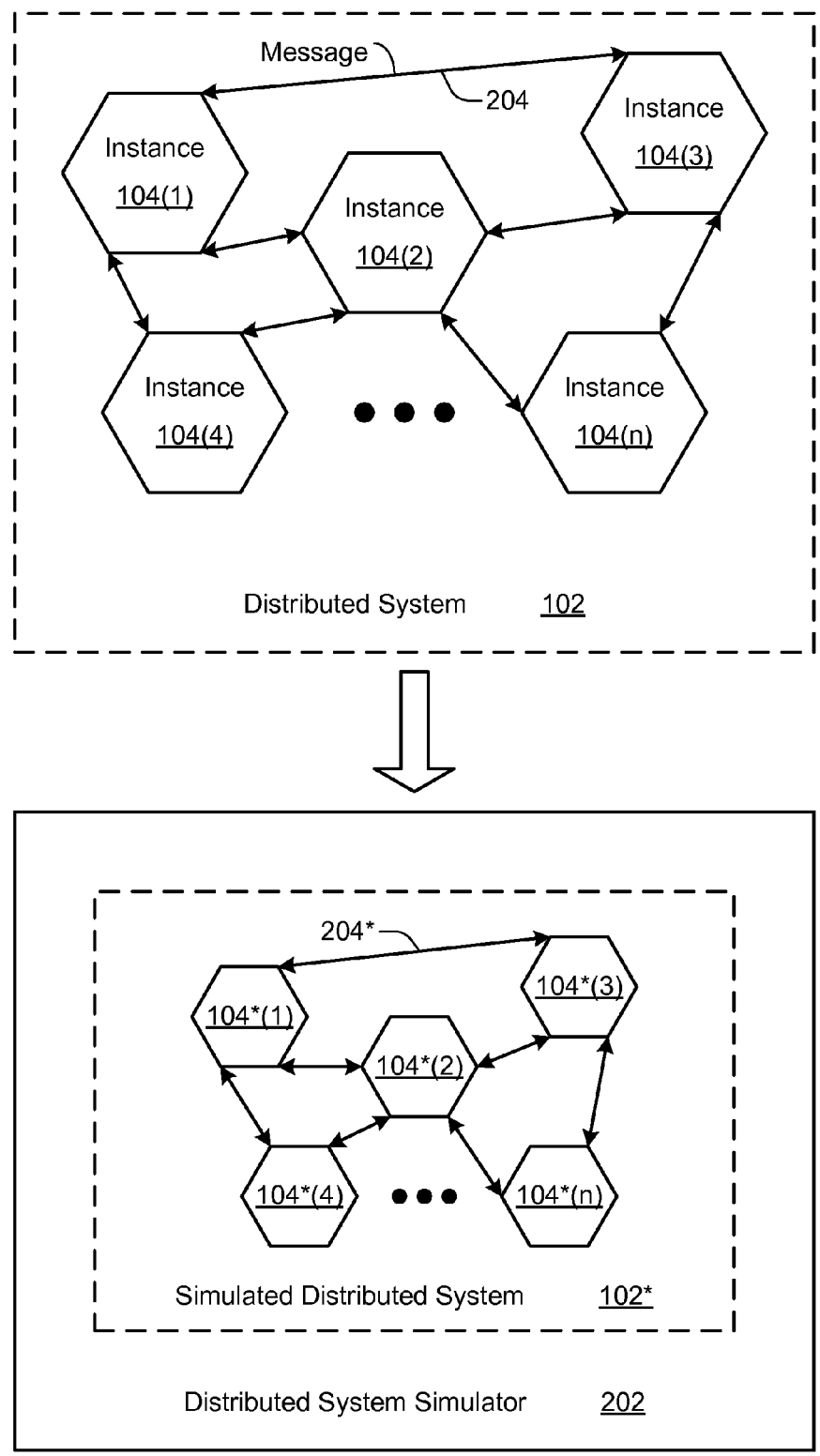
FIG. 2 is a block diagram of a distributed system that can be simulated with an example distributed system simulator.

FIG. 2 is a block diagram 200 of a distributed system 102 that can be simulated with an example distributed system simulator 202. As illustrated, distributed system 102 includes instances 104 and messages 204. Instances 104 send, receive, and otherwise exchange, messages 204 between the nodal instances. During actual operation of distributed system 102, instances 104 produce instance states 106 and distributed states 108 (both of FIG. 1). These production states 112 (also of FIG. 1) can be recreated by a simulation.

Distributed system simulator 202 includes simulated distributed system 102*. Simulated distributed system 102* includes simulated instances 104*(1 ... n) and simulated messages 204*. In an example embodiment, distributed system simulator 202 performs a simulation on distributed system 102 to produce simulated distributed system 102*. This simulation may involve a replaying of distributed system 102 to reproduce instance states 106 and distributed states 108. An example replaying is described below with particular reference to FIG. 3.

Figure 3:
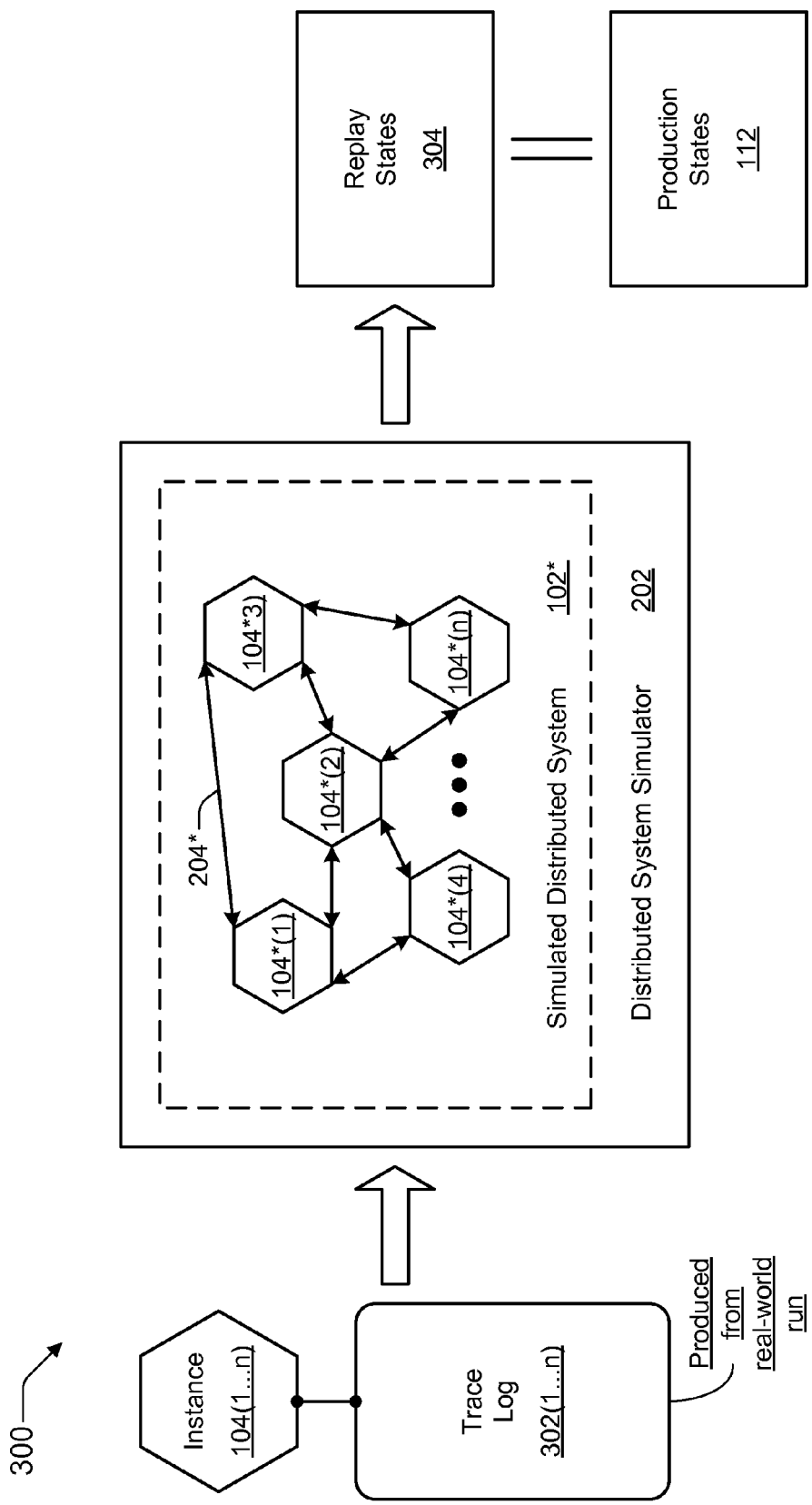
FIG. 3 is a block diagram of an example distributed system simulation that enables an execution replay to create replay states.

FIG. 3 is a block diagram of an example distributed system simulation 300 that enables an execution replay to create replay states. Distributed system simulation 300 includes a distributed system simulator 202 as well as example inputs and output results. As illustrated, the inputs are applied to distributed system simulator 202 on the left, and the results are output from distributed system simulator 202 on the right. Inputs include multiple respective instances 104(1 ... n) of distributed system 102 (of FIGS. 1 and 2) and multiple respective trace logs 302(1 ... n). Results can include replay states 304.

In an example embodiment, distributed system 102 is actually operated in the real world with instances 104 being appropriately distributed (e.g., across different devices) and trace events are logged into trace logs 302(1 ... n). These trace logs 302 are collected from the different real-world instances 104 and input into distributed system simulator 202. By way of example but not limitation, such trace logs 302 can include nondeterministic events, such as messages received from within the network and from sources external to the network, data read from files, thread scheduling decisions, environmental system calls, etc.; memory address allocations, heap relinquishments, etc.; system times, random number generation, etc.; and so forth.

In operation, trace logs 302 are replayed by distributed system simulator 202. For example, during a replay, events from different instances 104 are collected from trace logs 302, sequentialized into a total execution order based on a logical clock, and re-executed one-by-one in distributed system simulator 202. More specifically, the executable binary of each instance 104 may be rerun inside the simulator with, e.g., non-deterministic events being fed from trace logs 302.

A simulation controller (not separately shown) of distributed system simulator 202 is responsible for orchestrating the simulation of distributed system 102 to produce simulated distributed system 102*. The simulation controller controls the application of trace logs 302 as the replay simulation unfolds. It is responsible for the temporal ordering of events and thus maintains the "happens-before" relationships that occurred during the real-world operation. By way of example only, a logical clock such as Lamport's logical clock may be employed to preserve the "happens-before" relationships and the correct order of events from different nodes.

Distributed system simulator 202 produces replay states 304 corresponding to instances 104 using trace logs 302. With accurate trace logs 302 and a quality distributed system simulator 202, replay states 304 can be equivalent to the actual production states 112 from the execution of distributed system 102 in the real-world environment. Inconsistencies between replay states 304 and predicate states 114 (of FIG. 1) can be considered evidence of potential bugs.

Comparisons to detect inconsistencies between replay states 304 and predicate states 114 may be performed manually or may be performed automatically by predicate checker 110 (of FIG. 1). From the inconsistencies, one or more bugs can be detected and identified. Identification of the bug can enable the cause or causes of the bug to be determined, especially if cyclic debugging is enabled as described herein below. After determining the existence and cause(s) of a bug, a developer or other programmer can create and apply a fix to instances 104 of distributed system 102.

2: Example General Embodiments

Figure 4:
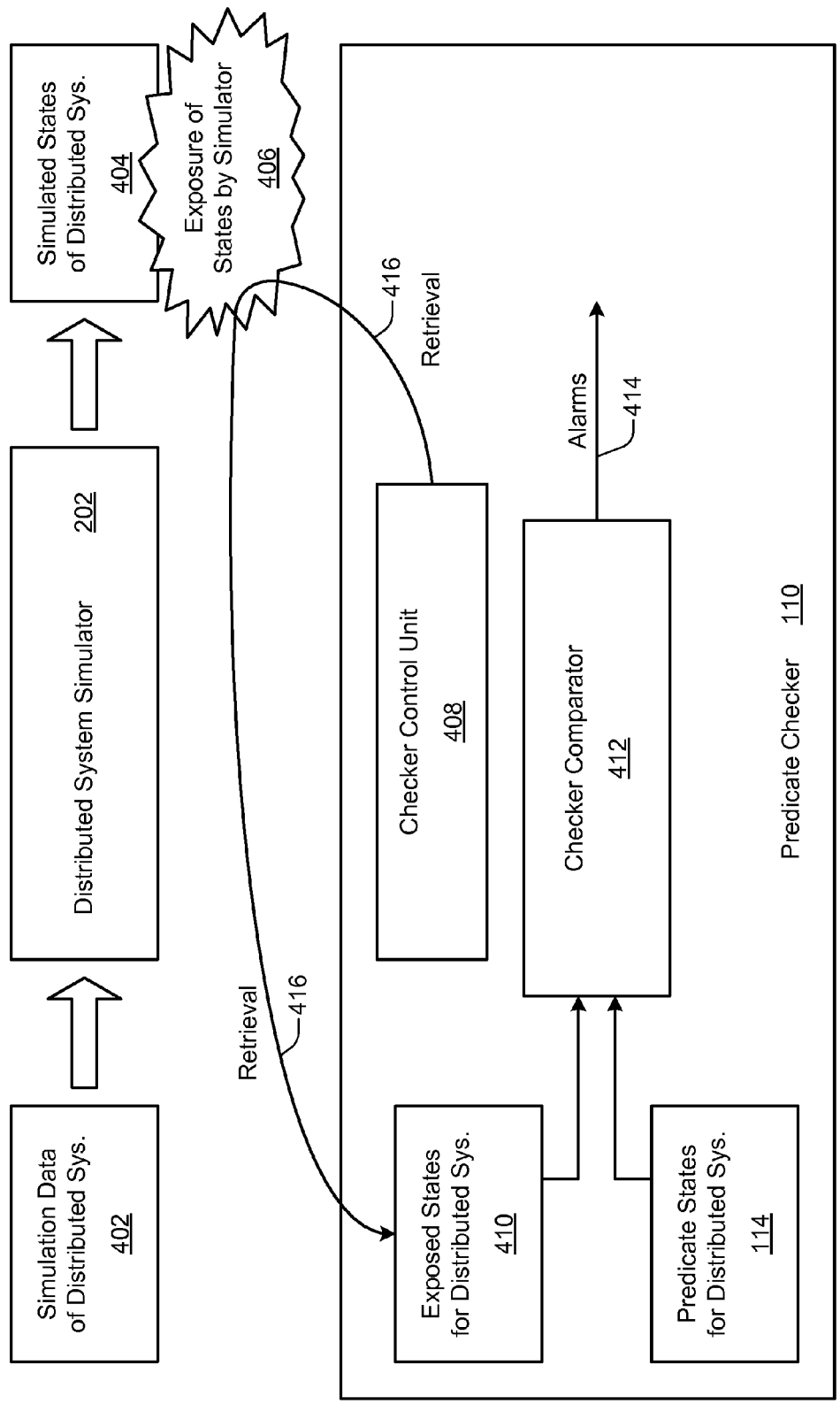
FIG. 4 is a block diagram of an example predicate checking scheme including a predicate checker and a distributed system simulation.

FIG. 4 is a block diagram of an example predicate checking scheme 400 including a predicate checker 110 and a distributed system simulation performed by distributed system simulator 202. As illustrated, predicate checking scheme 400 includes simulation data of a distributed system 402 and simulated states of a distributed system 404 in addition to distributed system simulator 202 and predicate checker 110. Predicate checker 110 includes a checker control unit 408, exposed states for a distributed system 410, predicate states for a distributed system 114, and a checking comparator 412.

In an example embodiment, simulation data of the distributed system 402 is simulation data for distributed system 102 (of FIGS. 1 and 2). Simulation data of the distributed system 402 may be trace logs 302, a specially-prepared testing script, some combination thereof, and so forth. Distributed system simulation data 402 is input to distributed system simulator 202. Distributed system simulator 202 performs a distributed system simulation on distributed system 102 using simulation data 402. From the distributed system simulation, distributed system simulator 202 creates simulated states of the distributed system 404.

Simulated states of the distributed system 404 are instance states 106 and/or distributed states 108 of distributed system 102 when distributed system simulation data 402 is applied to distributed system 102. When trace logs 302 are input to distributed system simulator 202 as simulation data 402, the output simulated states 404 are replay states 304 that are equivalent to the production states 112 that resulted during the actual real-world execution of distributed system 102 as reflected by trace logs 302. As is described in greater detail herein below, at least a selected portion of simulated states 404 are exposed at 406 by distributed system simulator 202.

The exposure of simulated states at 406 by distributed system simulator 202 enables checker control unit 408 to access simulated states of the distributed system 404. More specifically, checker control unit 408 is capable of retrieving at arrow 416 a copy of at least a portion of distributed system simulated states 404 and storing them as exposed states for the distributed system 410. Checker comparator 412 compares corresponding states from exposed states for the distributed system 410 to those of predicate states for the distributed system 114. Inconsistencies are detected by checker comparator 412. In response to detecting an inconsistency between an exposed state 410 and a predicate state 114, checker comparator 412 produces one or more alarms 414.

Thus, for an example embodiment of a device for checking predicates in conjunction with distributed systems, the device may include a distributed system simulator 202 to perform a simulation of a distributed system 102. Distributed system simulator 202 is to accept distributed system simulation data 402 as input and to output distributed system simulation states 404. Distributed system simulator 202 is capable of exposing at 406 any of distributed system simulation states 404.

The device also includes a distributed system predicate checker 110 that is to check predicates 114 in conjunction with distributed system 102. Distributed system predicate checker 110 includes exposed states for the distributed system 410 and predicate states for the distributed system 114. Predicate checker 110 also includes a checker control unit 408 and a checker comparator 412. Checker control unit 408 is to retrieve at arrow 416 exposed states from distributed system simulation states 404 as created by distributed system simulator 202 and is to insert the retrieved exposed states into exposed states for the distributed system 410. Checker comparator 412 is to compare distributed system exposed states 410 to distributed system predicate states 114 and is to produce at least one alarm 414 if an inconsistency is detected between exposed states 410 and predicate states 114.

Figure 5:
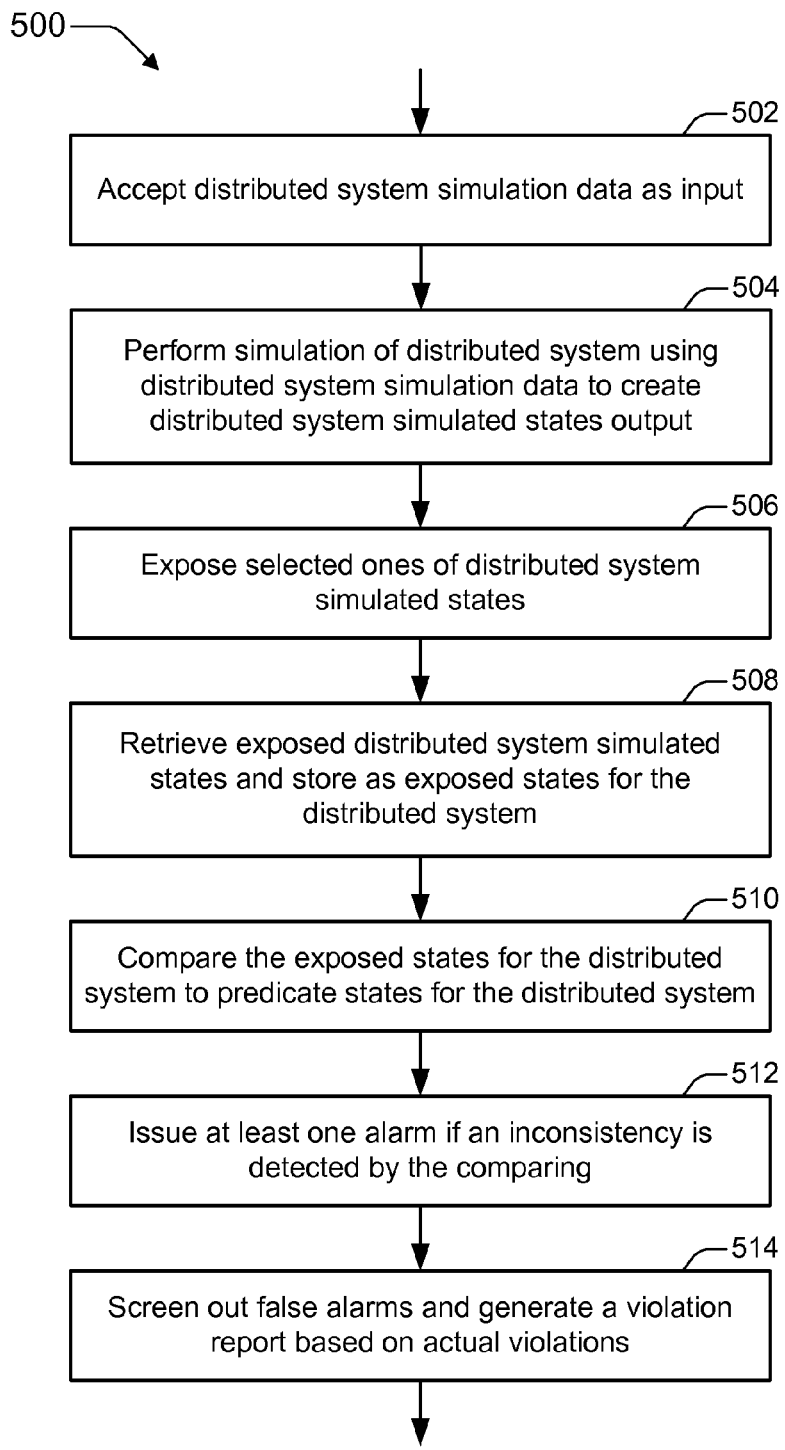
FIG. 5 is a flow diagram that illustrates an example of a method for checking predicates in conjunction with a distributed system.

FIG. 5 is a flow diagram 500 that illustrates an example of a method for checking predicates in conjunction with a distributed system. Flow diagram 500 includes seven blocks 502-514. Embodiments of flow diagram 500 may be realized, for example, as processor-executable instructions and/or a distributed system simulator 202 and predicate checker 110 (of FIGS. 1-4 and 6). Processor-executable instructions may be embodied as software, firmware, hardware, fixed logic circuitry, some combination thereof, and so forth.

The acts of flow diagram 500 may be performed in many different environments and with a variety of devices, including by a processing device 802 (of FIG. 8), which is described herein below. Although the descriptions of certain blocks and the acts thereof reference other elements that are described herein, they do so by way of example only. The order in which the method is described is not intended to be construed as a limitation, and any number of the described blocks can be combined, augmented, rearranged, and/or omitted to implement a respective method or an alternative method.

In an example embodiment, at action 502, distributed system simulation data is accepted as input. For example, a distributed system simulator 202 may accept distributed system simulation data 402 as input. At action 504, a simulation of a distributed system is performed using the distributed system simulation data to create distributed system simulated states as output. For example, distributed system simulator 202 may create distributed system simulated states 404 by performing a simulation of a distributed system 102 using distributed system simulation data 402.

At action 506, selected ones of the distributed system simulated states are exposed. For example, predetermined specified states of distributed system simulated states 404 may be exposed by distributed system simulator 202 to enable access to them by predicate checker 110. At action 508, at least a portion of the exposed distributed system simulated states are retrieved and stored as exposed states for the distributed system. For example, checker control unit 408 may retrieve at arrow 416 one or more states that have been exposed from distributed system simulated states 404 and may store the retrieved states by inserting them into distributed system exposed states 410.

At action 510, the exposed states for the distributed system are compared to the predicate states for the distributed system. For example, checker comparator 412 may compare corresponding states from exposed states 410 and predicate states 114. At action 512, at least one alarm is issued if an inconsistency is detected during the comparing. For example, checker comparator 412 may issue at least one alarm 414 if a state inconsistency is detected based on the comparing. At action 514, false alarms are screened out and a violation report is generated based on the remaining relevant alarms that are actual violations. Example components and further details for these action(s) are described below with particular reference to FIG. 6.

Figure 6:
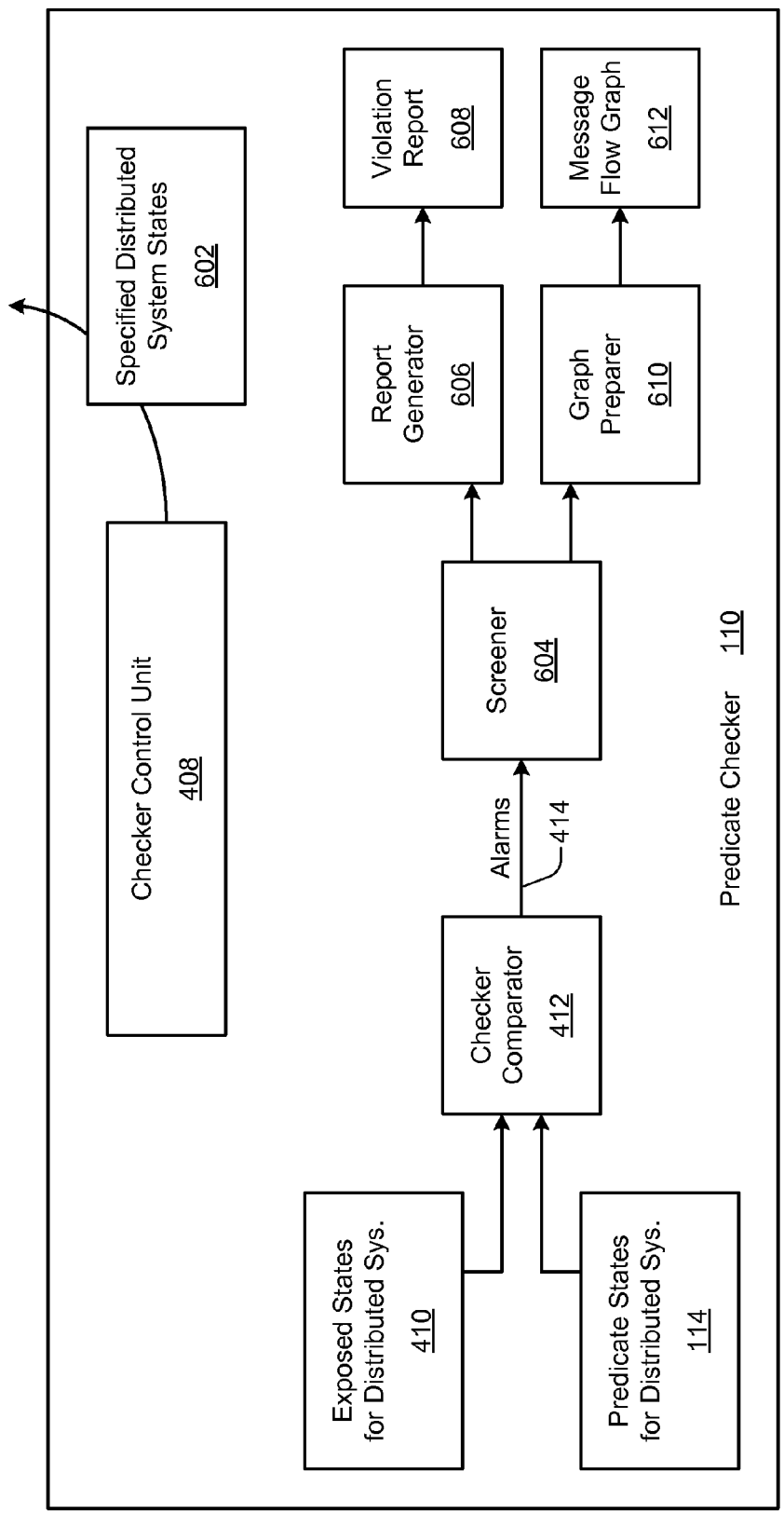
FIG. 6 illustrates additional aspects of an example predicate checker.

FIG. 6 illustrates example aspects of a predicate checker 110, which is also shown in FIGS. 1 and 4. As illustrated, predicate checker 110 includes predicate states for the distributed system 114 (from FIGS. 1 and 4), checker control unit 408, exposed states for the distributed system 410, and checker comparator 412 (each from FIG. 4). Predicate checker 110 also includes specified distributed system states 602, a screener 604, a report generator 606, a violation report 608, a graph preparer 610, and a message flow graph 612.

Specified distributed system states 602 specify which states are to be exposed at 406 by distributed system simulator 202 (as shown in FIG. 4). These distributed system states 602 are specified by an investigating user, such as a programmer, designer, debugger, and so forth. Those states that are included as part of specified distributed system states 602 are reflected back to checker control unit 408 by distributed system simulator 202. Example approaches to this variable reflection for different types of programming languages are described herein below in Section 3.

In an example embodiment, a versatile scripting language enables a user to specify system states that are to be observed and to define the predicates for invariants and correctness for specified distributed system states 602. After each step of the simulation (e.g., after each event-handling step), the observed states are retrieved from replayed states 304 of distributed system simulator 202 and refreshed by inserting them into a database for the exposed states of the distributed system 410. Predicate checker 110 evaluates predicate states 114 based on the current states from each of the replayed instances and issues alarms accordingly, which may then be included in generated violation reports. Because predicates generally reflect design properties, they are usually relatively easy to reason and write with a scripting language.

As described above, inconsistencies between exposed states 410 and predicate states 114 that are detected by checker comparator 412 result in the issuance of one or more alarms 414. However, many of these alarms 414 are false alarms. For example, correctness properties may be safety properties or liveness properties, and liveness properties may not be true at all times. Generally, screener 604 is to screen out false alarms and forward actual violations. Screener 604 forwards violations to report generator 606 and graph preparer 610.

More specifically for an example embodiment, screener 604 may screen out false alarms with auxiliary information. As noted above, unlike safety properties, liveness properties are only guaranteed to be true eventually. This can pose a difficult problem when checking liveness properties because many alarms can be false-alarms, or merely apparent violations. To screen out such false-alarms, user-defined auxiliary information is enabled to be calculated and output along with each alarm point. When an alarm is detected, the auxiliary information may used to produce stability measures based on user-provided heuristics so that true violations are forwarded from screener 604.

Report generator 606 receives the violations from screener 604. Report generator 606 is to generate one or more violation reports 608. A violation report 608 can be provided to an investigating user. A violation report 608 may list each of the violations in which an exposed state 410 fails to match a corresponding predicate state 114.

Graph preparer 610 receives the violations from screener 604. Graph preparer 610 is to prepare one or more message flow graphs 612. A message flow graph 612 is prepared based on event traces and can be provided to an investigating user. An example message flow graph 612 is described herein below with particular reference to FIG. 7. Violation report 608 and message flow graph 612 may be integrated into a visual development platform. A developer is thusly empowered to "time-travel" to violation points and then trace backwards while inspecting the full state to identify root causes of bugs.

In an example embodiment, the checking of user-defined predicates is executed at the event granularity. An event can be, for example, an expiration of a timer, the receiving of a message from another node, a scheduling and/or synchronization event (e.g., resuming/yielding a thread and/or acquiring/releasing a lock) specific for thread programming, and so forth. To effectuate a replay simulation, the execution of a single node or the entire distributed system is interpreted as a sequence of events, which are dispatched to corresponding handling routines. During the replay simulation, previously-executed events from the nodes are re-dispatched and ordered according to the "happens-before" relationship. In this manner, the complete execution of the entire distributed system may be replayed in the simulator with causality being preserved. Moreover, investigating users can incrementally refine predicates and re-evaluate them on the same execution as reproduced by the simulator. In other words, by means of replay, cyclic debugging is enabled.

Each time an event is dispatched, the checker evaluates predicates and reports violations for the current event step in the replay. Although predicate checking may be performed at an alternative boundary mechanism, event boundaries are used in an example implementation of predicate checking due to a number of factors. First, the event model is the basis of many protocol specifications, especially ones based on I/O-automata. A system built using an event model can be regarded as a set of state machines in which each event causes a state transition that is executed as an atomic step. Distributed properties thus change at the event boundary. Second, many widely adopted implementation models can be distilled into such an event-based model. For many situations, implementing predicate checking at the event granularity is not only efficient, but it is also sufficient as well.

3: Example Specific Embodiments

Example specific embodiments are described with reference to example implementations termed a Middleware Distributed System (MiDS) Checker. MiDS checker is built on top of a MiDS toolkit, which defines a set of APIs that developers can use to write generic distributed applications. Generally, a MiDS-based implementation can be simulated in a single simulation process, simulated on a cluster-based parallel simulation engine, deployed and run in real environment, and so forth. This is realized by linking the application binary to different runtime libraries (e.g., simulation, parallel simulation, deployment, etc.) that implement the same API interface. With a set of basic fault injection utilities, MiDS allows a system to be well tested inside its simulation-based testing framework before its release to deployment.

MiDS Checker implements replay functionality at the API level. Example APIs for this purpose are described below in this section. The replay functionality and the checker facility for an example MiDS implementation are also described. Various aspects of the specific MiDS implementations as described in this section may be incorporated individually or jointly in any combination with the more general example embodiments described above.

3.1: Example Programming Implementation with MiDS

The MiDS APIs are mostly member functions of the MiDSObject class, which typically implements one node instance of a distributed system. The MiDS runtime maintains an event queue to buffer pending events and dispatches them to corresponding handling routines (e.g., OnMsgHandler( )). Besides this event-driven model, MiDS also supports multi-threaded programming with its thread and synchronization APIs. The context switching of MiDS threads is encapsulated as events in the event queue. A non-preemptive scheduling is used in which the scheduling points are MiDS APIs and blocking system calls to support a user-level thread implementation. The fault-injection utilities include dropping or changing the latency of messages as well as killing or restarting MiDS objects.

Table 1 below lists example classes of MiDS APIs along with some specific API examples. It should be noted that a given implementation may include more or fewer APIs than those listed in Table 1.

TABLE 1

Example MiDS API set and Operating System APIs with logging and replay mechanisms.

| Category | API Example | Logging and Replay Mechanisms |
| --- | --- | --- |
| Example MiDS API Set | | |
| Event-driven program | SetTimer, KillTimer, OnTimerExpire | Log the event type and the sequence; redo the same events in replay. |
| Message communication | PostMsg, PostReliableMsg, OnMsgHandler | Embed Lamport Clock to maintain causal order, log incoming message contents. Replay with correct partial order, feed message content |

TABLE 1-continued

Example MiDS API set and
Operating System APIs with logging and replay mechanisms.

| Category | API Example | Logging and Replay Mechanisms |
| --- | --- | --- |
| Multi-threaded program | CreateThread, JoinThread, KillThread, YieldThread, Lock, Unlock | Log the schedule decision and the thread context. Ensure the same schedule decision and the same context during replay. |
| Socket APIs for network virtualization | MiDSSocket, MiDSListen, MiDSAccept, MiDSConnect, MiDSSend, MiDSRecv | Log the operation along with all received data. Feed the received data from log during replay. Sending operations become no-ops in replay. |
| Fault injection and message delay | ActivateNode, DeActivateNode, SetNetworkModel, OnCalculateDelay | Log the operation of activation/deactivation, and redo the operation in replay. |
| Example Operating System APIs (e.g., for MICROSOFT ® WINDOWS ®) | | |
| File system | CreateFile, OpenFile, ReadFile, WriteFile, CloseHandle, SetFilePointer | Log the operation along with all input data. Feed the input data from log during replay. Write operations become no-ops in replay. |
| Memory management | VirtualAlloc/Free, HeapAlloc/Free | Ensure identical memory layout in replay. |
| Miscellaneous | GetSystemTimeAsFileTime, GetLastError | Log the return value, and feed the same value in replay. |

3.2: Example Replay Enablement Implementation

For an example implementation, deterministic replay is capable of reproducing identical application memory states inside the simulator. These identical application memory states are achieved by logging nondeterministic inputs to the application and then feeding them to the replay simulator.

The MiDS runtime logs the following two classes of nondeterminism. The first class is internal to MiDS. The MiDS events, the MiDS thread scheduling decisions, and the incoming message content are recorded. The second class includes operating system calls, including reading from files, returned memory addresses for allocation and free in heap and memory address space, and miscellaneous calls such as system time and random number generation. Compression may be used to effectively reduce the log size.

In WINDOWS® NT® for example, each API call is redirected by the linker to the Import Address Table (IAT), from where another jump is taken to reach the real API function. The address in the IAT is changed, so the second jump leads to the appropriate logging wrapper, which logs the return results after the real API is executed. Furthermore, to enable consistent group replay, a Lamport Clock is embedded in each out-going message's header in order to preserve the "happens-before" relationship during the replay. Table 1 above describes logging and replay mechanisms for example API calls.

Checkpoints are used to avoid over-committing storage overhead for the logging and to support partial replay during replay procedures. A checkpoint includes the snapshot of memory of the MiDS process and the running context for user-level threads and sockets, as well as buffered events in the event queue.

Replaying procedures can start from the beginning of an execution or from a checkpoint. Checking predicates entails having the instances be replayed with causality among them preserved. Thus, during a replay events from different instances are collected from logs, sequentialized into a total execution order based on the Lamport Clock, and re-executed one-by-one in the simulator.

The replay simulation may be performed on one device or on multiple devices, including a cluster of devices. When replayed on a single device, the execution of the distributed system may be simulated in one or more simulation processes. The state of each simulated instance is stored in memory (e.g., RAM and/or disk-based storage) during the replay. The predicate checker itself also maintains a copy of the simulated states to be checked as part of the exposed states for the distributed system. Scalability of the predicate checking can be considered to be bounded by disk size and acceptable replay speed.

3.3: Example Predicate Checker Implementation

Deterministic replay that properly preserves causality enables the reconstruction of memory states of a distributed system in accordance with a real-world execution run. Predicate statements are also written to detect the violation points of correctness properties. With MiDS, a relatively simple scripting language can be used for specifying predicates. The scripting language enables developers to specify the structure of the investigated states, to retrieve them from memory states corresponding to the instances, and to evaluate properties from these retrieved states.

As noted above, the checking of predicates is invoked at event boundaries. In an example implementation, each time an event is re-executed in a replayed instance, the checker examines the state changes in the instances and re-evaluates the affected predicates. The states actually being checked via one or more comparisons are copies kept in a separate database of exposed distributed system states. The checker refreshes these states in the database from the simulated states of the replayed instance and evaluates predicates based on the state copies of the instances. Consequently, the predicate checking may be decoupled from the state memory layout of the simulated instances. Moreover, the simulated states of all instances of the distributed system need not reside in memory simultaneously even for evaluating global properties. This approach can increase the scalability of the replay and checker functionality. Maintaining copies separately in the exposed states memory also enables past versions of states to be saved for subsequent accessibility if desired.

Certain example aspects for a checker implementation are described in the following subsections. First, reflection techniques are addressed, including reflection facilities that make memory states in C++ objects observable by the checker. Second, state maintenance and predicate evaluation techniques are described. Third, auxiliary information that are associated with violations are presented to deal with false-alarms.

3.3.1: Example Memory States Observation Via Reflection

For programming languages such as JAVA and C# that support runtime reflection, the type system and user-defined data structures are observable during the runtime using facilities that are native to these languages. However, this is not the case for C++. To check the application states, the memory address of each allocated C++ object with type information is recorded during its lifetime. The C++-based executable is analyzed and code is injected to track class types and object addresses. For example, a compiler-independent intermediate representation of binary code can be created, from which basic blocks, function calls, and the symbol table that contains type definitions may be listed. A logging function is then injected for function calls of constructors and deconstructors of the classes. The logging function dumps the timestamp and the type of operation (e.g., construction or deconstruction) along with the address of the object and the type information. This information is used by the checker to inspect memory states.

The following example assembly code shows an example of a constructor after code injection. The lines beginning with "*" are injected code. They call an injected logging function "onConstruct" with the index number of this class found in the symbol table. A similar code injection is performed for object deconstructions. As a result, at each step of replay, the checker is capable of enumerating pointers for each of the objects of a certain class, and it is further capable of reading their memory fields based on the symbol table. The runtime overhead is usually negligible since the actions are only triggered at object allocation and deallocation time. The example assembly with the injected code is as follows:

```
$L1: (refs=0) START MyClass::MyClass
MyClass::MyClass: (refs=1)
this = ENTERFUNC
    * [ESP], {ESP} = push 0x17 //index number for MyClass
    * call _imp_onConstruct@4, $out[ESP] //call log func
[ESP], {ESP} = push EBP
EBP = mov ESP [ESP],
{ESP} = push ECX
... // other code in original constructor
ESP = mov EBP EBP,
{ESP} = pop [ESP]
{ESP} = ret {ESP}, MyClass::MyClass
MyClass::MyClass: (refs=1) Offset: 32(0x0020)
EXITFUNC
$L2: (refs=0) END
```

The code injection may be performed manually or automatically. In addition, APIs may be provided that enable developers to explicitly calculate and expose states of an instance in the source code.

3.3.2: Example State Definitions and Predicate Evaluations

An example script implementation for predicate evaluation includes three parts: (1) declaration of tables, (2) declaration of internal variables for the checker, and (3) specified predicates. Table 2 illustrates an example script having three such parts. (The example script is applicable to checking the Chord protocol as implemented on Macedon.) It should be understood that scripts may be formulated in alternative manners and include more or fewer parts. Table 2 is as follows:

TABLE 2

Example Predicate Checking Script Format.

```
                                # define data table
declare_table Node from CChord
    column id as m_nodeid
    column pred as m_predecessor
    column succ as m_successor
    column status as m_status
end_declare
                                # define checker variables
declare_derived last_churn_time
begin_python
    for x In Node :
        if (x.status == 0          # status "0" means joining
                or Runtime.msd_id== 108);        # MSG_FAIL_NOTIFY
            return Runtime.current_time;
    return last_churn_time;
end_python
declare_derived stabilized
begin_python
    retval = (Runtime.current_time − last_churn_time) / 10.0;
            if (retval < 1) : return retval;
    return 1;
end_python
                                # define predicates
predicate RingConsistency auxiliary stabilized{
    forall x in Node, exist y in Node,
        x.pred==y.id and y.succ == x.id
}
```

The first section of the example script above (i.e., the part identified by "# define data table") instructs the checker to observe objects of some classes and refresh the states of certain member fields into tables of the distributed system exposed states database. An example table organization is as follows: Each row of the table corresponds to one object in the system, and the columns correspond to states of member fields. Each table has two built-in columns "instance_id" and "memory_addr", which correspond to the replayed instance and the object's memory address, respectively. The declaration enables the user to stipulate shorthand notations to name the table and the instance states. A table stores global states from each of the instances. For example, the table "Node" maintains the investigated states of the distributed nodes of the system. It is possible to keep a history of a state for checking. If present, a "keep_version(N)" after a column declaration further declares that the recent N versions of the state are to be kept in the table.

The second section (i.e., the part identified by "# define checker variables") allows an investigating user to define variables internal to the checker with the keyword "declare_derived". These variables can also have histories, using the "keep_version(N)" indicator. Between "begin_python" and "end_python" are python snippets to calculate the value of a named variable. The python snippet has read access to values of each of the prior declarations (e.g., data tables and internal variables) using the declared names. Data tables are regarded as enumerable python containers, indexed by (instance_id, memory_addr) pair.

The last section (i.e., the part identified by "# define predicates") uses the keyword "predicate" to specify correctness properties based on declared states and variables. They are checked after refreshing the tables and the evaluation of the internal variables. In an example implementation, each predicate can be a Boolean expression. Logical operators (e.g., and, or, imply, etc.) are supported. Two quantifiers, "forall" and "exist", are supported that specify the extent of validity of a predicate when dealing with tables. These built-in operators facilitate specifying many useful invariants. In Table 2, a predicate specifies that the ring should be well formed: if node x believes node y to be its predecessor, then y must regard x as its successor. (This is a relevant property for the stabilization of Chord topology.) The auxiliary information "Stabilized" is reset to 0 when joins or failures occur; otherwise it gradually grows to 1.

After each step of the replay, an example implementation of the checker performs the following acts: First, it enumerates the objects of classes defined in data tables in the memory of replayed instances. It uses the type information and memory address provided by the log to refresh the table, inserting or deleting rows and updating the columns accordingly. After updating tables, the checker also knows which declared states have changed. It can therefore focus the re-evaluation on the affected derived values and predicates, according to data dependency. When one or more predicates are evaluated as "false", the checker outputs the violation in a violation report, possibly after screening out false-alarms. An example violation report may include: the violated predicates, a Lamport Clock value for each violation, any auxiliary information defined in the script, and so forth.

It may be useful at times to replay and check a segment of execution, rather than the entire execution starting from the beginning. Thus, the states maintained by checker scripts may be reconstructed when a checkpoint is loaded. Checkpoints are supported in replay runs by storing both replay context and the tables and variables used by predicate scripts. These replay checkpoints can be used seamlessly for later checking. To start checking with an intermediate checkpoint from a testing run, the investigating user provides additional scripts to setup the states required by the script from the memory of instances in the checkpoint.

3.3.3: Example Auxiliary Information for Violations

For safety properties that must hold all of the time, each alarm can be considered to reveal a bug case. In contrast, liveness properties are guaranteed to be true eventually (but not constantly), so an alarm on a liveness property is not necessarily a bug case. For example, many overlay network systems employ self-stabilizing protocols to deal with churns; consequently, most of their topology-related properties are liveness ones. As a result, checking liveness properties can generate a large number of false-alarms that overwhelm the actual real violations. Adding a time bound to liveness properties is not always a desirable approach because it is often difficult to derive an appropriate time bound.

To address this issue, investigating users are empowered to attach auxiliary information to the specified predicates. The auxiliary information is a user-defined variable calculated along with the predicate, and it is output when the predicate is apparently violated. Developers can use the information to help screen out false-alarms and/or to prioritize violations. For liveness properties, an appropriate usage for auxiliary information is to output the measurement of the stabilization condition. For example, in Table 2 the eventual "RingConsistency" property is associated with an auxiliary variable "Stabilized", which ranges from 0 to 1, as a measure of stabilization that shows the "confidence" of the violation.

Additionally, some built-in system parameters may be maintained in the checker. For example, the following parameters may be maintained: the current time in the node, the current message type, statistics of recent messages of each type, and so forth. These parameters can be directly accessed with the scripts, and they are applicable to stabilization measurement.

3.4: Example Visualization Tools

In an attempt to pinpoint the root cause of a bug, an investigating user often traces back in time from a violation point. In addition to providing a replay facility, an example implementation prepares a message flow graph (e.g., described below with particular reference to FIG. 7) based on message traces to make this time traveling process easier. Thus, an investigating user can perform time traveling by following the message flow in a message flow graph and then replay the execution of the distributed system to a selected event point so as to inspect the memory state of the replayed instance at that event point. The visualization can facilitate understanding the system behaviors as well as the root cause of a bug after detecting a violation.

Figure 7:
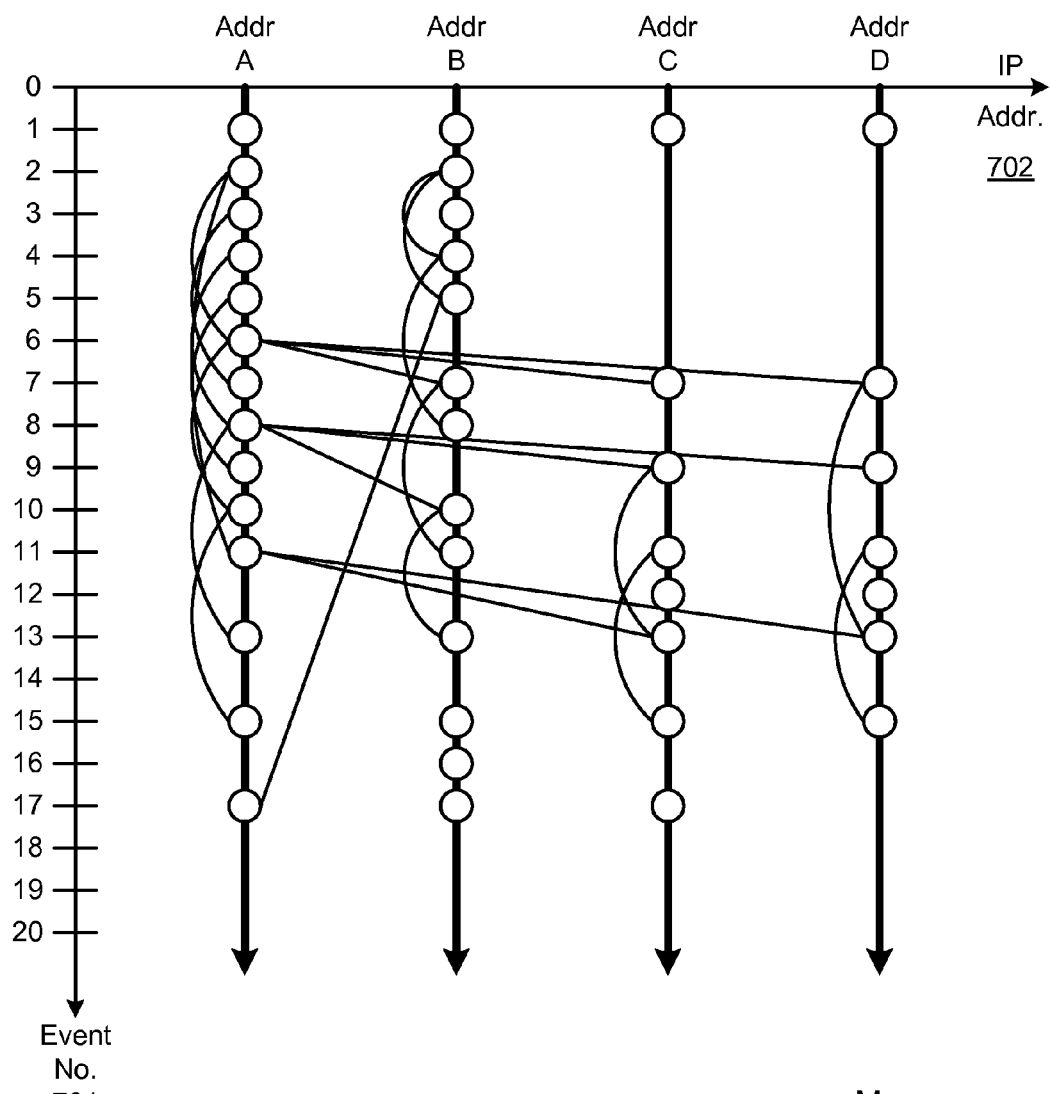
FIG. 7 is an example message flow graph that may be prepared during a predicate checking procedure.

FIG. 7 is an example message flow graph 612 that may be prepared during a predicate checking procedure. Message flow graph 612 includes an internet protocol (IP) address axis 702 and an event number axis 704. Each IP address A, B, C, D, . . . corresponds to a distributed system instance. An instance may be identified (e.g., "instance_id") in an alternative manner in lieu of an IP address, such as nodal number, other network address, application instance serial number, and so forth.

The thicker vertical lines for each IP address represent the histories of different instances. The circular nodes represent event handlings. The arcs denote messages across instances and/or event handlings. The arcs with two ends on the same vertical line are timer events or messages sent from the instance to itself.

Example Device Implementations for Predicate Checking for Distributed Systems

Figure 8:
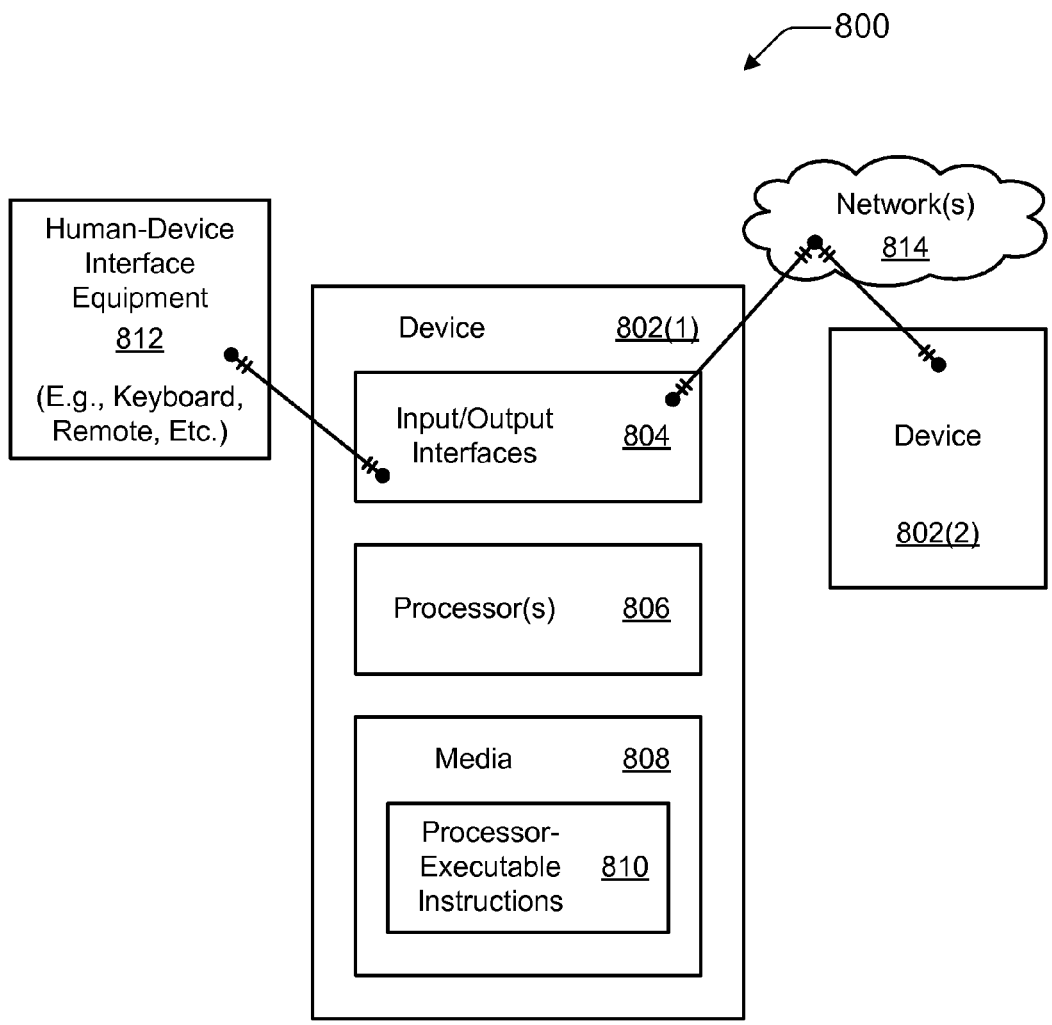
FIG. 8 is a block diagram of an example device that may be used to implement embodiment(s) for predicate checking in conjunction with distributed systems.

FIG. 8 is a block diagram 800 of an example device 802 that may be used to implement embodiment(s) for predicate checking in conjunction with distributed systems. For example, a distributed system simulator 202 (of FIG. 2-4) and/or a predicate checker 110 (of FIGS. 1, 4, and 6) may be implemented on one or more devices 802. As illustrated, two devices 802(1) and 802(2) are capable of engaging in communications via network(s) 814. Although two devices 802 are specifically shown, one or more than two devices 802 may be employed, depending on implementation. Network(s) 814 may be, by way of example but not limitation, an internet, an intranet, an Ethernet, a public network, a private network, a cable network, a digital subscriber line (DSL) network, a telephone network, a Fibre network, a Grid computer network, an avenue to connect to such a network, a wireless network, a mesh network, some combination thereof, and so forth. Alternatively, two devices 802 may be directly connected.

Generally, a device 802 may represent any computer or processing-capable device, such as a server device; a workstation or other general computer device; a data storage repository apparatus; a personal digital assistant (PDA); a mobile phone; a gaming platform; an entertainment device; a router computing node; a mesh or other network node; a wireless access point; some combination thereof; and so forth. As illustrated, device 802 includes one or more input/output (I/O) interfaces 804, at least one processor 806, and one or more media 808. Media 808 include processor-executable instructions 810.

In an example embodiment of device 802, I/O interfaces 804 may include (i) a network interface for communicating across network 814, (ii) a display device interface for displaying information on a display screen, (iii) one or more human-device interfaces, and so forth. Examples of (i) network interfaces include a network card, a modem, one or more ports, a network communications stack, a radio, and so forth. Examples of (ii) display device interfaces include a graphics driver, a graphics card, a hardware or software driver for a screen or monitor, and so forth. Examples of (iii) human-device interfaces include those that communicate by wire or wirelessly to human-device interface equipment 812 (e.g., a keyboard, a remote, a mouse or other graphical pointing device, a screen, etc.).

Generally, processor 806 is capable of executing, performing, and/or otherwise effectuating processor-executable instructions, such as processor-executable instructions 810. Media 808 is comprised of one or more processor-accessible media. In other words, media 808 may include processor-executable instructions 810 that are executable by processor 806 to effectuate the performance of functions by device 802. Processor-executable instructions may be embodied as software, firmware, hardware, fixed logic circuitry, some combination thereof, and so forth.

Thus, realizations for predicate checking in conjunction with distributed systems may be described in the general context of processor-executable instructions. Generally, processor-executable instructions include routines, programs, applications, coding, modules, protocols, objects, components, metadata and definitions thereof, data structures, application programming interfaces (APIs), etc. that perform and/or enable particular tasks and/or implement particular abstract data types. Processor-executable instructions may be located in separate storage media, executed by different processors, and/or propagated over or extant on various transmission media.

Processor(s) 806 may be implemented using any applicable processing-capable technology, and one may be realized as a general purpose processor (e.g., a central processing unit (CPU), a microprocessor, a controller, etc.), a graphics processing unit (GPU), a derivative thereof, and so forth. Media 808 may be any available media that is included as part of and/or accessible by device 802. For example, the device 802 may also include additional data storage devices (removable and/or non-removable) such as, for example, magnetic disks, optical disks, or tape. Such additional storage may include removable storage and/or non-removable storage. Media 808 may include, at least, two types of computer-readable media, namely computer storage media and communication media. Computer storage media may include volatile and non-volatile, removable, and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD), or other optical storage, magnetic cassettes, magnetic tape, magnetic disk storage or other magnetic storage devices, or any other non-transmission medium that can be used to store the desired information and which can be accessed by the device 802. Any such computer storage media may be part of the device 802.

In contrast, communication media may embody computer-readable instructions, data structures, program modules, or other data in a modulated data signal, such as a carrier wave, or other transmission mechanism. As defined herein, computer storage media does not include communication media.

As specifically illustrated, media 808 comprises at least processor-executable instructions 810. Generally, processor-executable instructions 810, when executed by processor 806, enable device 802 to perform the various functions described herein. Such functions include, but are not limited to: (i) those acts that are illustrated in flow diagram 500 (of FIG. 5); (ii) those of a distributed system simulator 202 (of FIG. 2-4); (iii) those of a predicate checker 110 (of FIGS. 1, 4, and 6)); (iv) those undertaken to check predicates in conjunction with a distributed system (e.g., as shown in FIGS. 4 and 6); (v) other schemes and techniques described herein; combinations thereof; and so forth.

The devices, acts, aspects, features, functions, procedures, modules, data structures, techniques, components, parts, etc. of FIGS. 1-8 are illustrated in diagrams that are divided into multiple blocks and other elements. However, the order, interconnections, interrelationships, layout, etc. in which FIGS. 1-8 are described and/or shown are not intended to be construed as a limitation, and any number of the blocks and/or other elements can be modified, combined, rearranged, augmented, omitted, etc. in any manner to implement one or more systems, methods, devices, procedures, media, apparatuses, arrangements, etc. for predicate checking in conjunction with distributed systems.

Although systems, media, devices, methods, procedures, apparatuses, mechanisms, schemes, approaches, processes, arrangements, and other example embodiments have been described in language specific to structural, logical, algorithmic, and functional features and/or diagrams, it is to be understood that the invention defined in the appended claims is not necessarily limited to the specific features or acts described above. Rather, the specific features and acts described above are disclosed as example forms of implementing the claimed invention.

What is claimed is:

1. A device comprising:
   a processor;
   a distributed system simulator, executable by the processor, that performs a simulation of a distributed system and outputs exposed simulation states; and
   a distributed system predicate checker, executable by the processor, that retrieves at least a portion of the exposed simulation states and compares the portion of the exposed simulation states to user-defined predicate states for the distributed system.

2. A device as recited in claim 1, wherein the distributed system simulator is configured to accept as input a plurality of instances of the distributed system and respective trace logs for each instance, the trace logs being produced by a real-world execution run and the exposed simulation states comprising replay states that are equivalent to production states that resulted during the real-world execution run.

3. A device as recited in claim 2, wherein the trace logs include non-deterministic events selected from a group comprising:
   messages received within the distributed system;
   data read from files in the distributed system;
   thread scheduling decisions;
   environmental system calls;
   memory address allocations;
   heap relinquishments;
   system times; and
   random number generations.

4. A device as recited in claim 1, wherein the distributed system predicate checker is configured to issue at least one alarm if an inconsistency is detected between an exposed simulation state and a corresponding user-defined predicate state.

5. A device as recited in claim 1, wherein the distributed system simulator is further configured to output distributed system simulation states, and the exposed simulation states and the distributed system simulation states are stored in separate memories so that a memory configuration of the distributed system simulation states is not disturbed by the distributed system predicate checker.

6. A device as recited in claim 1, wherein the exposed simulation states are specified by a user so that they can be observed and debugged during performance of the simulation.

7. A device as recited in claim 1, wherein the user-defined predicate states for the distributed system assert correctness properties that are expected to be correct during an operation of the distributed system.

8. A device as recited in claim 7, wherein the correctness properties comprise safety properties or liveness properties.

9. A device as recited in claim 8, wherein the user-defined predicate states for the distributed system comprise auxiliary information that are associated with the liveness properties, and the device further comprises a screener that uses the auxiliary information to screen out false alarms on the liveness properties.

10. A device as recited in claim 9, wherein the auxiliary information is a user-defined variable calculated for a respective predicate state that provides a stability indication for a detected inconsistency.

11. A device as recited in claim 1, further comprising a report generator that generates and provides reports of one or more violations that result when an exposed simulation state fails to match a corresponding user-defined predicate state.

12. A device as recited in claim 11, further comprising a graph preparer that prepares a message flow graph based on the one or more reported violations.

13. One or more computer-readable storage media comprising processor-executable instructions that, when executed by a processor, configure a device to:

accept distributed system simulation data from a distributed system;
perform a simulation of the distributed system using the distributed system simulation data, thereby creating distributed simulated states;
expose at least a portion of the distributed simulated states; and
compare the exposed distributed simulated states to predicate states for the distributed system.

14. The one or more computer-readable storage media as recited in claim 13, wherein the processor-executable instructions further configure the device to:
   issue at least one alarm if an inconsistency is detected between an exposed distributed simulated state and a corresponding predicate state;
   screen out false alarms using auxiliary information associated with the predicate states; and
   generate a violation report based on identified violations, the violation report including violated predicates.

15. The one or more computer-readable storage media as recited in claim 14, wherein the auxiliary information includes one or more variables calculated for the predicate states, the one or more variables providing a stability indication for a detected inconsistency.

16. The one or more computer-readable storage media as recited in claim 13, wherein the distributed system simulation data is associated with a plurality of instances of the distributed system and respective trace logs for each instance, the trace logs being produced by a real-world execution run, and the exposed distributed simulation states comprising replay states that are equivalent to production states that resulted during the real-world execution run.

17. The one or more computer-readable storage media as recited in claim 16, wherein the trace logs include non-deterministic events selected from a group comprising:
   messages received within the distributed system;
   data read from files in the distributed system;
   thread scheduling decisions;
   environmental system calls;
   memory address allocations;
   heap relinquishments;
   system times; and
   random number generations.

18. The one or more computer-readable storage media as recited in claim 13, wherein the exposed distributed simulation states are specified by a user so that they can be observed and debugged during performance of the simulation.

19. The one or more computer-readable storage media as recited in claim 13, wherein the predicate states are user-defined.

20. A method comprising:
   comparing, by a processor, exposed simulated states for a distributed system to predicate states for the distributed system provided by a user;
   issuing one or more alarms when an exposed simulated state is inconsistent with a corresponding predicate state;
   screening out false alarms using auxiliary information associated with the predicate states; and
   generating a violation report identifying violations that result once the false alarms are screened.

* * * * *